UNITED STATES PATENT OFFICE.

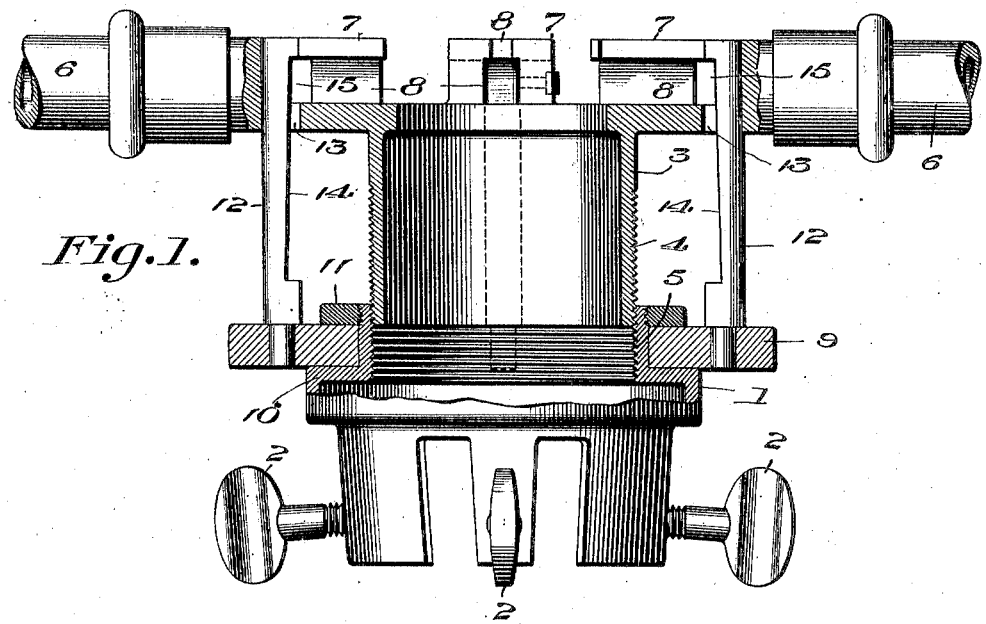

CHARLES G. WAHNSIEDLER, OF EVANSVILLE, INDIANA.

GEARED, ADJUSTABLE, PIPE-THREADING DEVICE.

1,345,567. Specification of Letters Patent. Patented July 6, 1920.

Application filed June 23, 1919. Serial No. 306,054.

*To all whom it may concern:*

Be it known that I, CHARLES G. WAHNSIEDLER, a citizen of the United States, residing at Evansville, in the county of Vanderburgh and State of Indiana, have invented certain new and useful Improvements in Geared, Adjustable, Pipe-Threading Devices, of which the following is a specification.

This invention relates to geared, adjustable pipe threading devices. In pipe threading devices where the dies or chasers move in slots in a head, considerable trouble is caused by waste, cuttings of metal, oil, and other material collecting in the channels or slots in which the dies or chasers move. This interferes with the proper action of the dies or chasers and causes inconvenience and loss of time in taking out the dies and cleaning the channels.

My invention has for its object the provision of means whereby the channels or slots in which the dies or chasers are held may be freely and quickly cleaned of waste, cuttings of metal, oil and any foreign material which may get into said channels. The invention comprises a cross slot intersecting the channel or slot in which the die or chaser is located. This slot is preferably located across the "blind" end of the channel or slot in which the die or chaser is located. When the invention is applied to a type of pipe threading device such as shown in the patent to William Vosper No. 763,816, dated June 28, 1904, wherein tapered pins are employed for automatically allowing the dies or chasers to recede as the threading operation advances, the slot is located in line with the opening through which the controlling pin passes, that is, at the inner, blind end of the channel. As the cleaning slot, constituting my invention, is provided in connection with each die slot or channel and extends completely across the raised parts on the head wherein the die slots are provided a piece of waste or rag can be drawn completely through the cleaning slot I have provided, or through one branch of it and through the die slot, thus enabling the die slot to be quickly and easily cleaned of cuttings, oil, pieces of waste or other material which interferes with the proper operation of the dies.

My improvements are shown and described in connection with a pipe threading device such as shown in the Vosper Patent 763,816, but I do not limit the invention to use in connection with that particular type of threading device nor to any type as my clean out slot or opening may be provided in connection with the channel or slot which holds the die or chaser of any tool or appliance using a cutter of a die which is movable in a channel.

In the accompanying drawings,

Figure 1 is a side elevation, partly in section, showing a geared adjustable pipe threading device with my improvements applied, and Fig. 2 a plan view, one of the die holders being in section.

The work holder 1 is provided with clamping screws 2 by which it may be secured on the pipe which is to be threaded. The die carrying head 3 has screw threads 4 engaging corresponding threads 5 on the work holder 1. Handles 6 attached to the head 3 afford means for rotating said head. Rotation of the head 3 causes it to advance into the work holder 1 by reason of the arrangement of the screw threads 4 and 5. The head 3 is provided on its upper face with raised parts 7 having die holding slots or channels 8. To better illustrate my improvements, the dies or chasers, which operate in the channels 8, have been omitted.

A collar 9 which is rotatable on the flange or shoulder 10 of the work holder 1, is held against displacement by a nut 11. Secured to and rising from the collar 9 are the feeding or adjusting pins 12 which project upwardly through the openings 13 which vertically intersect the die channels 8. The inner faces 14 of the pins 12 are tapered and the outer ends of the dies or chasers bear against said tapered faces. Consequently, as the screw threading operation proceeds and the head 3 works into the holder 1, the dies or chasers move outwardly or away from each other and thus cut a tapered thread on the pipe being threaded.

As thus far described, the device is the same in principle as that set forth in the patent to Vosper 763,816, June 28, 1904.

Heretofore much inconvenience has been experienced and time lost due to the metal cuttings, oil, pieces of waste, and other foreign material working into the channels 8 and interfering with the operation of the dies or chasers, and it has been difficult to clean the channels 8.

My improvement consists in the provision of a clean out opening or slot 15 intersecting the slot 8 and located, by preference, immediately in front of the pin 12, in each instance. By thus locating the clean out opening 15, it is not only positioned at the blind end of the channel 8, but also intersects the opening 13. While I preferably provide a clean out slot 15 which extends completely across the raised guide part 7, it is within the spirit of my invention to provide a slot 15 which enters only one side of the guide 7 and communicates with the slot or channel 8.

A small piece of rag or waste may be introduced through the clean out slot or opening 15 and drawn completely therethrough from side to side of the guide 7, or, the piece of rag or waste may be entered through one end of the opening 15 and drawn through the channel or slot 8, or the piece of rag or waste may be entered through the opening 15 and drawn through the opening 13. Cleaning of the channel 8 may be readily had when the clean out slot 15 is used, whether said slot extends all the way across the guide 7 or only in through one side thereof.

What I claim is:

1. In a tool having a head provided with channels which are blind at their outer ends, clean-out openings intersecting the respective channels.

2. In a tool having a head provided with channels which are blind at their outer ends, clean-out openings intersecting the respective channels, chasers or cutters slidable in the channels, and feeding devices for said cutters which engage the outer extremities of the cutters.

3. In a tool having a head provided with channels, clean-out openings intersecting the respective channels, chasers or cutters slidable in the channels, and feeding devices for said cutters which engage the outer extremities of the cutters.

4. In a tool having a head provided with channels which are blind at their outer ends, clean-out openings intersecting the respective channels in the region of the outer ends of said channels.

5. In a tool having a head provided with channels, chasers or cutters slidable in the channels, and feeding devices for said cutters which engage the outer extremities of the cutters, said head having cleanout openings intersecting the channels in the region where the cutters are engaged by the feeding devices.

6. In a threading device provided with a head having a channel to hold a movable die or chaser and a pin arranged to cross the channel and adapted to coöperate with the die or chaser, a clean out opening intersecting the channel in the region of the point of contact of the pin and die or chaser and also intersecting the opening in which the pin works.

In testimony whereof I affix my signature.

CHARLES G. WAHNSIEDLER.